United States Patent [19]

Takagi et al.

[11] Patent Number: 4,889,442
[45] Date of Patent: Dec. 26, 1989

[54] WRITING INSTRUMENT WITH INK QUANTITY OF LEVEL DETECTING FUNCTION

[75] Inventors: Hiroshi Takagi, Yokohama; Toshiaki Serikawa, Zushi; Noriaki Tsunoda, Tano, all of Japan

[73] Assignee: Mitsubishi Pencil Co., Ltd., Tokyo, Japan

[21] Appl. No.: 177,469

[22] Filed: Apr. 1, 1988

[51] Int. Cl.4 .......................... B43K 29/00; B43K 7/06
[52] U.S. Cl. ...................................... 401/194; 401/142; 401/190; 401/209; 73/307; 116/204; 222/51; 346/17; 346/140 A
[58] Field of Search .................... 401/187, 188 A, 190, 401/194, 209, 213, 141, 142; 222/51, 61, 62, 67; 346/140 R, 140 A, 17; 116/204; 73/307, 308, 314; 141/219

[56] References Cited

U.S. PATENT DOCUMENTS

| 559,034 | 4/1896 | Laughlin | 401/141 X |
| 2,582,043 | 1/1952 | Krahulec | 346/140 A |
| 3,389,603 | 6/1968 | Jacobs, III | 73/308 |
| 3,495,920 | 2/1970 | Spaulding | 401/188 A X |
| 3,775,015 | 11/1973 | Tsunoda et al. | 401/142 X |
| 4,014,010 | 3/1977 | Jinotti | 222/51 |
| 4,350,458 | 9/1982 | Murahara et al. | 401/194 X |
| 4,415,886 | 11/1983 | Kyogoku et al. | 346/140 R |
| 4,532,800 | 8/1985 | Coleman | 73/308 |

FOREIGN PATENT DOCUMENTS

| 0028399 | 5/1981 | European Pat. Off. | 401/194 |
| 0042052 | 3/1985 | Japan | 346/140 A |

Primary Examiner—Richard J. Apley
Assistant Examiner—David J. Bender
Attorney, Agent, or Firm—Oliff & Berridge

[57] ABSTRACT

A writing instrument with ink quantity or level detecting function which has an ink tube containing ink, and a float so arranged in intimate contact with the rear end surface of the ink in the ink tube as to be driven in contact with the rear end surface of the ink upon decrease of the ink in the ink tube. Further, a magnetic sensor is further provided externally at the writing instrument, while the float is formed of magnetic material. Thus, lack of the ink in the ink tube of this writing instrument can be readily detected.

5 Claims, 2 Drawing Sheets ered this. The position of the float is sensed by the sensor mounted in the apparatus within which the writing instrument is associated, such as an automatic drawing machine, recording meter, etc. The hardly realized problem of the visual observation of the ink in the ink tube is readily solved.

WRITING INSTRUMENT WITH INK QUANTITY OF LEVEL DETECTING FUNCTION

BACKGROUND OF THE INVENTION

This invention relates to a writing instrument with an ink quantity or level detecting function.

Since the ink quantity or level in an ink tube in a writing instrument used in an automatic drawing machine, various automatic recording meters, or the like cannot be visually observed when the ink tube is formed of opaque synthetic resin, metal or the like, such a conventional writing instrument has a difficulty that lack of ink might occur in the course of writing in the various automatic drawing machines or the like.

SUMMARY OF THE INVENTION

It is therefore an object of this invention to provide a writing instrument with an ink quantity or level detecting function in which all the aforementioned drawbacks and disadvantages of the conventional writing instrument can be eliminated and which can readily detect the lack of ink.

Another object of this invention is to provide a writing instrument with an ink quantity or level detecting function in which the ink level can be visually observed and/or an alarm for lack of ink can be readily produced.

Yet another object of this invention is to provide a writing instrument with an ink quantity or level detecting function which does not need the alteration of the conventional manufacturing steps nor necessitate the formation of a special type of an ink tube so as to readily detect the lack of ink or the level of the ink.

Still another object of this invention is to provide a writing instrument with ink quantity or level detecting function which can be inexpensively manufactured in mass production.

According to one aspect of the present invention, there is provided a writing instrument with an ink quantity of level detecting function which comprises a float driven in contact with the rear or upper end of ink contained in an ink tube so as to follow the decrease in the ink in the ink tube and formed of magnetic material or metal sensitive to magnetism.

BRIEF DESCRIPTION OF THE DRAWINGS

The above and other relates objects and features of the invention will be apparent from a reading of the following description of the disclosure found in the accompanying drawings and the novelty thereof pointed out in the appended claims.

DESCRIPTION OF THE PREFERRED EMBODIMENTS

Figure 1:
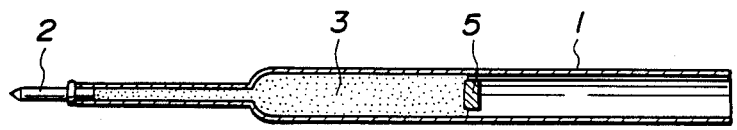
FIG. 1 is a longitudinal side sectional view of one preferred embodiment of a ball point pen according to the present invention.

Reference is now made to the drawings, and particularly to FIG. 1 which shows one preferred embodiment of the writing instrument of a ball point pen constructed according to the present invention, wherein like reference numerals designate the same or equivalent parts in the respective views.

Reference numeral 1 generally designates an ink tube capable of also functioning as a barrel of a ball point pen. A ball point tip 2 is fixedly engaged at the end of the ink tube 1. Ink 3 is filled in the ink tube 1.

Figure 2:
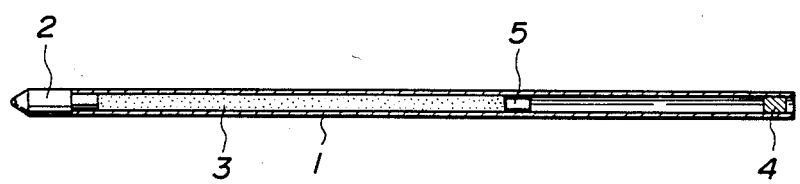
FIG. 2 and FIG. 3 are longitudinal side sectional views of other preferred embodiments of gas pressure type ball point pens.
Figure 3:
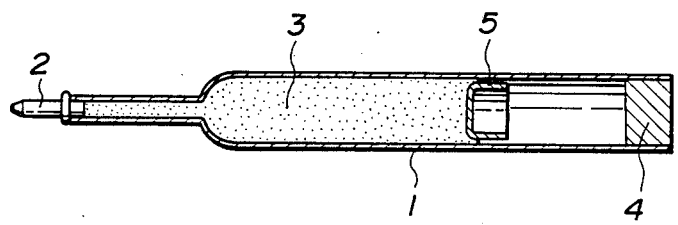

As particularly shown in FIGS. 2 and 3, a rear closure 4 is snugly fitted to the rear end of the ink tube 1 as required, and pressurized gas may be filled and is sealed in the ink tube 1.

A float 5 is advantageously so arranged in intimate contact with the rear end surface of the ink 3 in the ink tube 1 as to be driven in contact with the rear end surface of the ink 3 upon decrease of the ink 3 in the ink tube 1.

The float 5 is formed of a material which may be determined depending upon the material of the ink tube 1, as formed, for example, of magnetic powder mixed resin, magnetic material, e.g., permanent magnet or the like or metallic material sensitive to the magnetism, e.g., iron, nickel material when the ink tube 1 is made of a synthetic resin tube or a brass tube, and is formed of iron with nickel plating for preventing its rust when the ink tube 1 is made of stainless still tube.

As evidently shown in FIGS. 2 and 3, when the ink tube 1 is so formed that the body of the ink tube 1 is increased in outer diameter larger than the tip side thereof to increase the quantity of the ink 3 contained in the ink tube 2, a sub float (not shown) so formed that the diameter is smaller than the inner diameter of the reduced-diameter tip side is provided and is loosely fitted to the float 5. Thus, the sub float may be moved to the inner end of the ink tube 1 upon decrease of the ink 3 in the ink tube 1, thereby accurately detecting the quantity of the ink 3 in the ink tube 1.

Figure 4:
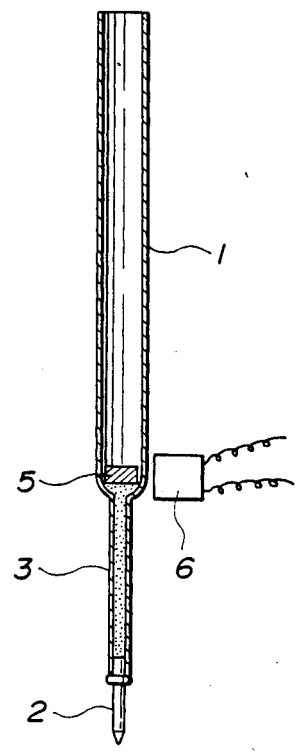
FIG. 4 is an elevational sectional view of the ball point pen at the time of using the pen.

Referring now to FIG. 4, the writing instrument of the embodiment thus constructed as described above according to the present invention may be associated within a variety of apparatus, e.g., an automatic drawing machine, an automatic recording meter or the like and the float 5 in the ink tube 1 is detected by a magnetic sensor 6 associated in advance within the above apparatus when the float 5 in the ink tube 1 arrives at the tip 3 side upon decrease of the ink 3 in the ink tube 1, and the sensor 6 will thus produce a signal upon sensing of the change of the magnetism due to the decrease of the quantity or level of the ink 3 in the ink tube 1. Therefore, when this sensor is connected to an interlocking circuit or a warning circuit of the above apparatus, it can notify the lack of ink in the ink tube 1.

The magnetic sensor 6 may, for example, employ a high frequency oscillation type proximity switch, reed switch, etc.

The foregoing description relates to the embodiment of the writing instrument, e.g., a ball point pen, but in an ordinary pen (not shown) or the like, an air chamber or the like is formed in a float which can float in the ink of the ink tube, and the float may be formed of metallic material sensitive to the magnetism or the above magnetic material.

Since the writing instrument of this invention is thus constructed as described above, when the writing instrument is used under the condition that the quantity or level of the ink in the ink tube cannot be visually observed in a utility that the existence of the ink volume is indispensable, the position of the float 5 can be confirmed by the magnetic sensor 6, thereby dispatching the alarm representing lack of the ink in the ink tube.

Since the float 5 may be formed merely of magnetic material or metal sensitive to the magnetism in the writing instrument of the present invention, the conventional manufacturing steps of the instrument are not necessarily altered nor the ink tube of particular shape is necessitated, thereby inexpensively preforming* the mass production of this writing instruments.

It is appreciated from the foregoing description that constructed, the quantity or level of the ink in the ink tube can be readily detected in the writing instrument in which the ink cannot be visually observed, and the writing instrument can be readily and inexpensively produced with a simple construction.

What is claimed is:

1. A writing instrument with ink quantity or level detector function comprising;
    an ink tube having a ball point tip at one end and containing ink therein,
    a float itself formed of a magnetic material and so arranged substantially in contact with the rear end surface of the ink in said ink tube as to be driven in contact with the rear end surface of the ink upon decrease of the ink in said ink tube, and
    a magnetic sensor externally provided for detecting the quantity or level of the ink in said ink tube when said float in said ink tube arrives at the tip side thereof upon decrease of the ink in said ink tube.

2. The writing instrument according to claim 1, further comprising a rear closure snugly fitted to the rear end of said ink tube, and pressurized gas filled in said ink tube.

3. The writing instrument according to claim 1, wherein said float is formed of a magnetic material selected from the group consisting of magnetic powder mixed resin, permanent magnet, and metallic material sensitive to magnetism when said ink tube is formed of synthetic resin tube or brass tube.

4. The writing instrument according to claim 1, wherein said float is formed of a magnetic material selected from the group consisting of iron with nickel plating and metallic material sensitive to magnetism when said ink tube is formed of stainless steel tube.

5. The writing instrument according to claim 1, wherein said magnetic sensor is formed of a high frequency oscillator type proximity switch, or a reed switch.

* * * * *